United States Patent [19]

Shimazaki

[11] Patent Number: 5,052,530
[45] Date of Patent: Oct. 1, 1991

[54] VIBRATION ABSORBING MECHANISM FOR AN AUTOMOBILE AIR CONDITIONING COMPRESSOR

[75] Inventor: Seiji Shimazaki, Isesaki, Japan

[73] Assignee: Sanden Corporation, Gunma, Japan

[21] Appl. No.: 650,982

[22] Filed: Feb. 4, 1991

Related U.S. Application Data

[63] Continuation of Ser. No. 385,890, Jul. 28, 1989, abandoned.

[30] Foreign Application Priority Data

Jul. 28, 1988 [JP] Japan ................. 63-99958[U]

[51] Int. Cl.$^5$ .............................................. F60B 35/06
[52] U.S. Cl. ............................. 188/379; 267/141.2; 267/292; 248/606
[58] Field of Search ................. 267/146.1 A, 146.1 R, 267/146.1 C, 141, 141.1, 141.2, 141.3, 141.4, 141.5, 153, 292, 293, 294; 188/378, 379, 380; 403/225, 227, 228; 248/605, 606, 614, 615, 560, 562, 636, 638

[56] References Cited

U.S. PATENT DOCUMENTS

| | | | |
|---|---|---|---|
| 1,862,483 | 7/1932 | Lord | 248/605 |
| 2,019,052 | 10/1935 | Lord | 267/292 X |
| 2,212,142 | 8/1940 | Austin et al. | 267/141.1 |
| 2,540,767 | 2/1951 | Tabbert | 418/2 |
| 2,901,195 | 8/1959 | Simpson | 248/666 |
| 3,242,791 | 3/1966 | Smith | 188/379 |
| 3,274,394 | 9/1966 | Maheu | 290/1 R |
| 3,476,309 | 11/1969 | Harlin | 417/572 |
| 3,494,540 | 2/1970 | Dixon | 92/161 |
| 3,514,089 | 5/1970 | Harbers | 267/153 X |
| 3,813,776 | 6/1974 | Frederickson et al. | 30/381 |
| 4,406,344 | 9/1983 | Fukushima | 267/292 |
| 4,452,418 | 6/1984 | Urushihara et al. | 248/666 |
| 4,600,367 | 7/1986 | Terauchi et al. | 417/360 |
| 4,666,122 | 5/1987 | Goodard | 248/666 |
| 4,834,336 | 5/1989 | Shimazaki et al. | 248/666 |

FOREIGN PATENT DOCUMENTS

| | | | |
|---|---|---|---|
| 2658019 | 7/1978 | Fed. Rep. of Germany | |
| 1517677 | 3/1968 | France | 188/379 |
| 57-61252 | 4/1982 | Japan | |
| 430918 | 6/1935 | United Kingdom | 248/605 |

*Primary Examiner*—Matthew C. Graham
*Attorney, Agent, or Firm*—Banner, Birch, McKie & Beckett

[57] ABSTRACT

A vibration absorbing mechanism for a compressor in an automotive air conditioning system is disclosed which comprises a mass which includes a first penetration hole; first and second bushings, each of said bushings including an inner cylinder which is provided with a second penetration hole, an outer cylinder and an elastic member which is disposed and compressed between the outer surface of the inner cylinder and the inner surface of the outer cylinder; and a screw bolt. The first and second bushings are disposed at both ends of the mass to align the first penetration hole with the second penetration holes. The screw bolt passes through the first penetration hole and each of the second penetration holes and then is fastened by a nut. According to the above mechanism, vibration which the compressor receives from an engine through a mounting bracket can be reduced. Therefore, durability and silentness of the compressor also can be improved.

3 Claims, 3 Drawing Sheets

VIBRATION ABSORBING MECHANISM FOR AN AUTOMOBILE AIR CONDITIONING COMPRESSOR

This application is a continuation of application Ser. No. 385,890, filed July 28, 1989, abandoned.

FIELD OF THE INVENTION

This invention relates to a vibration absorbing mechanism for a compressor, and more particularly, to an improved vibration absorbing mechanism for reducing vibration of a compressor in an automotive air conditioning system.

BACKGROUND OF THE INVENTION

A compressor, which is used in an automotive air conditioning system, is usually mounted on the engine of the automobile through a suitable mounting bracket. In the above structure, if strength of the mounting bracket is insufficient relative to the weight of the compressor, vibration which occurs on the compressor on the basis of vibration of the engine is enlarged by the mounting bracket, and may achieve a huge level. The enlargement of vibration of the compressor may produce the point of resonance thereof with respect to vibration of the engine within the range of usual rotational engine speed.

Excess vibration may reduce the durability of the compressor. Moreover, the mounting bracket may be broken by fatigue. In the prior art to reduce the above problem, it is known to increase the strength and/or stiffness of the mounting bracket by increasing the thickness of the mounting bracket or the number of reinforced ribs thereon.

However, even though such a mounting bracket is used, the technique of increasing the strength and/or stiffness of the mounting bracket does not significantly contribute to reducing compressor vibration because vibration of the mounting bracket is increased due to increasing the weight thereof.

Moreover, it may be impossible to take the space in an engine room to mount such a mounting bracket.

In addition, if an engine produces a large vibration or a compressor resonates with an engine, even though the strength of a mounting bracket is greatly increased, the compressor vibration level may still be large.

SUMMARY OF THE INVENTION

It is a primary object of the present invention to provide a vibration absorbing mechanism for an automotive air conditioning compressor which can reduce vibration which the compressor receives from an engine through a mounting bracket, thereby improving durability and quietness of the compressor.

A vibration absorbing mechanism for a compressor in an automotive air conditioning system according to the present invention comprises a mass which includes a first penetration hole; first and second bushings, each of said bushings including an inner cylinder which is provided with a second penetration hole, an outer cylinder and an elastic member which is disposed and compressed between the outer surface of the inner cylinder and the inner surface of the outer cylinder. The first and second bushings are disposed at both ends of the mass with substantial alignment of the first penetration hole with the second penetration holes of each of the bushings. A screw bolt passes through the first and second penetration holes and is fastened by a nut.

Further objects, features and aspects of this invention will be understood from the following detailed description of the preferred embodiment of this invention and by referring to the annexed drawings.

DETAILED DESCRIPTION

Figure 1:
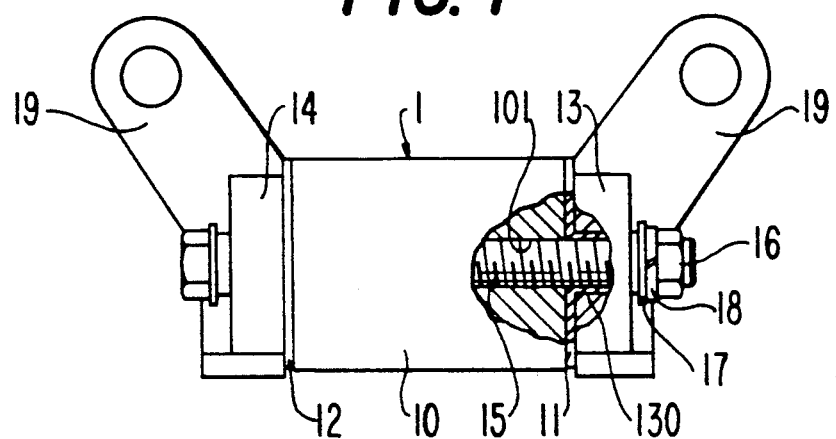
FIG. 1 is a front view of a vibration absorbing mechanism in accordance with one embodiment of the present invention.
Figure 2:
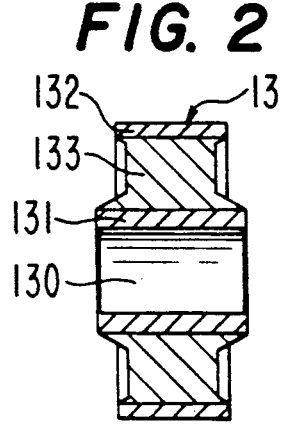
FIG. 2 is a cross-sectional view of a bushing as shown in FIG. 1.

Referring to the drawings, FIG. 1 illustrates a vibration absorbing mechanism 1 having a cylindrical mass 10 made of materials having large specific gravity, such as iron, stopper rubbers 11 and 12 attached at both ends of cylindrical mass 10, and bushings 13 and 14. Penetration hole 101 is axially formed through cylindrical mass 10 and stopper rubbers 11 and 12 to penetrate there between. As shown in FIG. 2, bushing 13, which is the same as bushing 14, is constructed of inner cylinder 131 including a second penetration hole 130, outer cylinder 132 and elastic member 133, such as rubber. Elastic member 133 is disposed and compressed between the outer surface of inner cylinder 131 and the inner surface of outer cylinder 132. Inner cylinders 131 contact the ends of mass 10 to transmit the compressor vibration to the mass. Stopper rubbers 11 and 12 are loosely disposed between mass 10 and bushings 13 and 14, and prevent contact other than the contact between mass 10 and inner cylinders 131, as described above, between mass 10 and bushings 13 and 14 when the amplitude of the vibration of mass 10 is large. The attachment means, for example, the U-shaped attachment 19, to mount vibration absorbing mechanism 1 to a compressor is fixed on the outer surface of bushings 13 and 14, for example by brazing. Screw bolt 15 passes through penetration holes 130 (first bushing), 101 and 130 (second bushing) and is fastened with nut 16 through washer 17 and spring washer 18.

The vibration frequency of cylindrical mass 10 is adjusted to correspond to vibration frequency of a compressor, e.g., a point of resonance thereof, by varying the weight of cylindrical mass 10, size of bushings 13 and 14, and hardness of elastic member 133.

Figure 3:
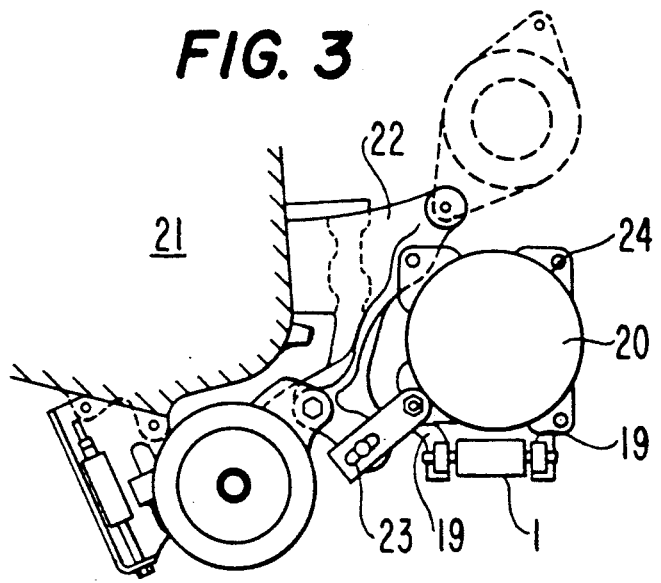
FIG. 3 is a schematic view illustrating the installed state of a vibration absorbing mechanism as shown in FIG. 1.

FIG. 3 illustrates the installed state of vibration absorbing mechanism 1. Compressor 20 is mounted on engine 21 through mounting bracket 22 and adjustable stay 23. Vibration absorbing mechanism 1 is installed on compressor 20 through attachment 19 by fastening a screw bolt into hole 24 formed on compressor 20.

Figure 4A:
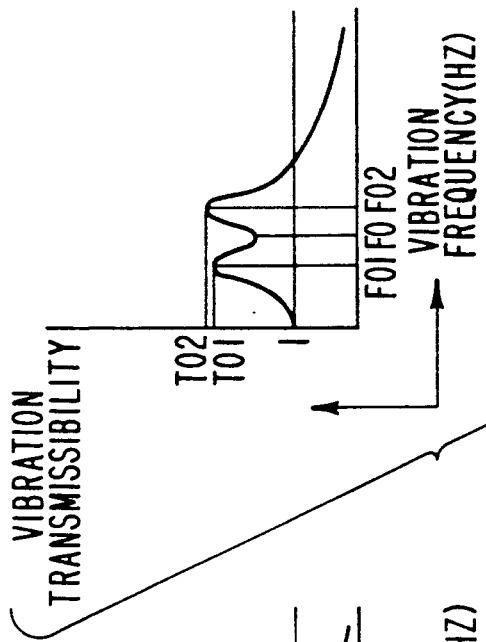
FIGS. 4(a), 4(b), and 4(c) are descriptive views illustrating operating principle of a vibration absorbing mechanism as shown in FIG. 1.
Figure 4B:
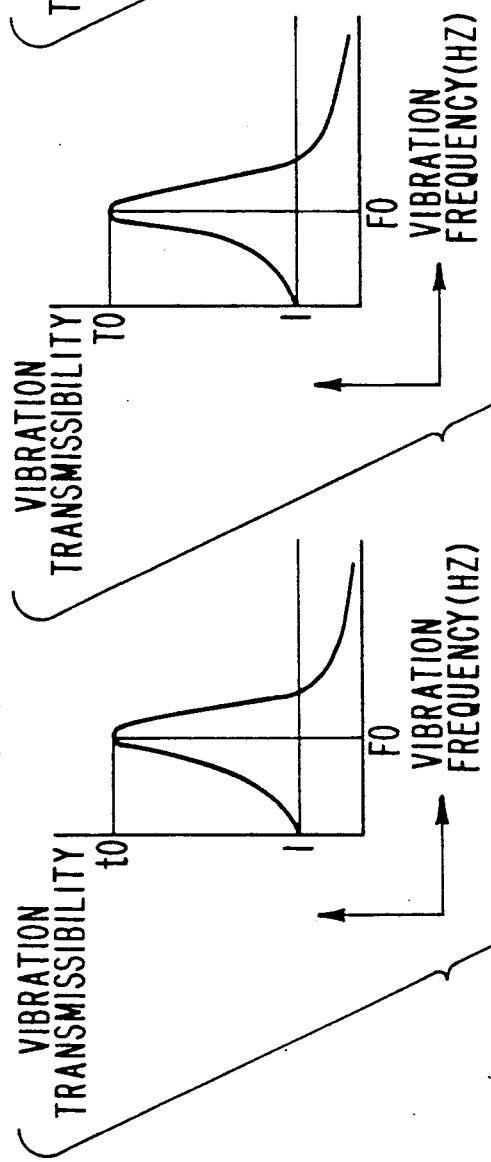
Figure 4C:
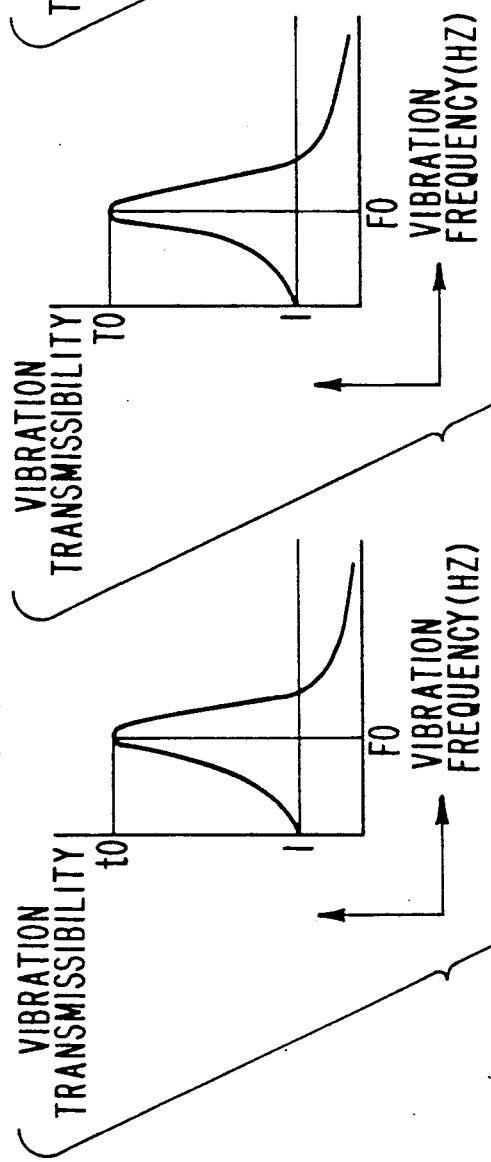

FIGS. 4(a)–4(c) illustrate operating principle of a vibration absorbing mechanism in accordance with one embodiment of the present invention. In FIG. 4, M and m represent mass; K and k represent spring constants; and C and c represent dampening coefficients. X is the amplitude of the oscillation or vibration of the mass m (FIG. 4(a)), M (FIG. 4(b)), or of the compressor (FIG. 4(c)). Xo is the amplitude of the oscillation or vibration of the engine. As shown in FIG. 4(b), a compressor has an M-K-C vibration system and when its vibration frequency is at the point of resonance (F0), vibration transmissibility is at its peak (T0). Likewise, a vibration absorbing mechanism according to the present invention has an m-k-c vibration system, which has the same vibration frequency, i.e., resonant frequency F0, as the compressor, as shown in FIG. 4(a). When the vibration frequency of the compressor is F0, vibration transmissibility is peak t0. If the vibration absorbing mechanism is installed on the compressor to reduce peak t0 of resonance point F0, vibration of the M-K-C vibration system changes to have two resonance points F01 amd F02 as shown in FIG. 4(c). Peaks T01 and T02 of vibration transmissibility corresponding to resonance points F01 and F02 become much lower than peak T0, respectively.

Figure 5:
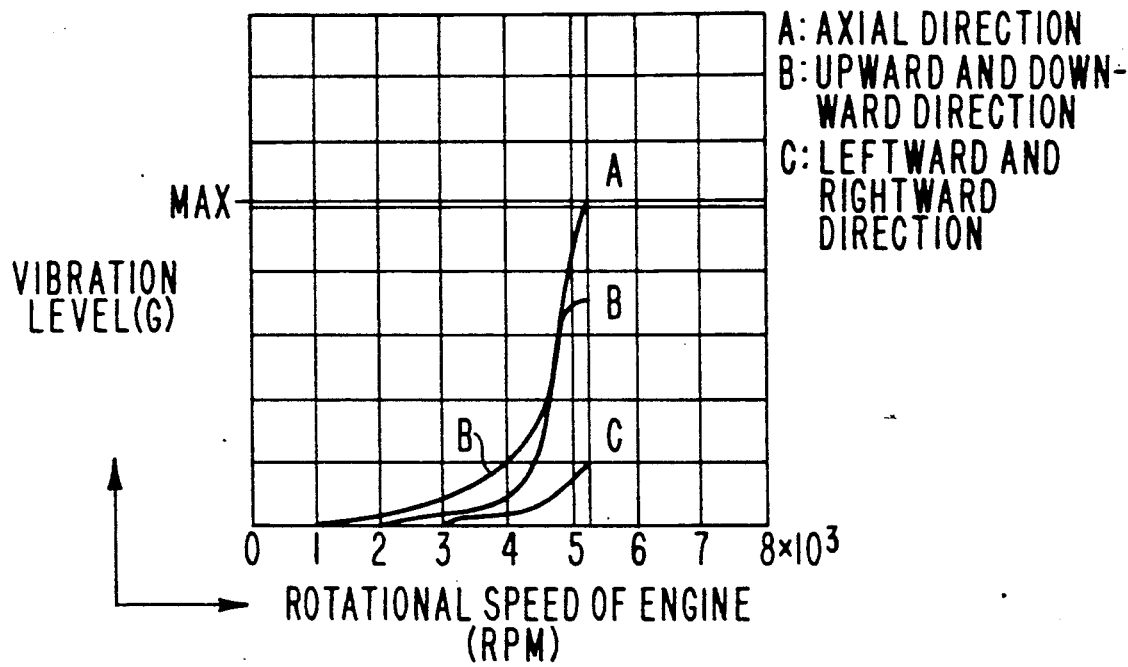
FIG. 5 is a graph illustrating the relationship between rotational speed of an engine and vibration level in a conventional automotive air conditioning system.
Figure 6:
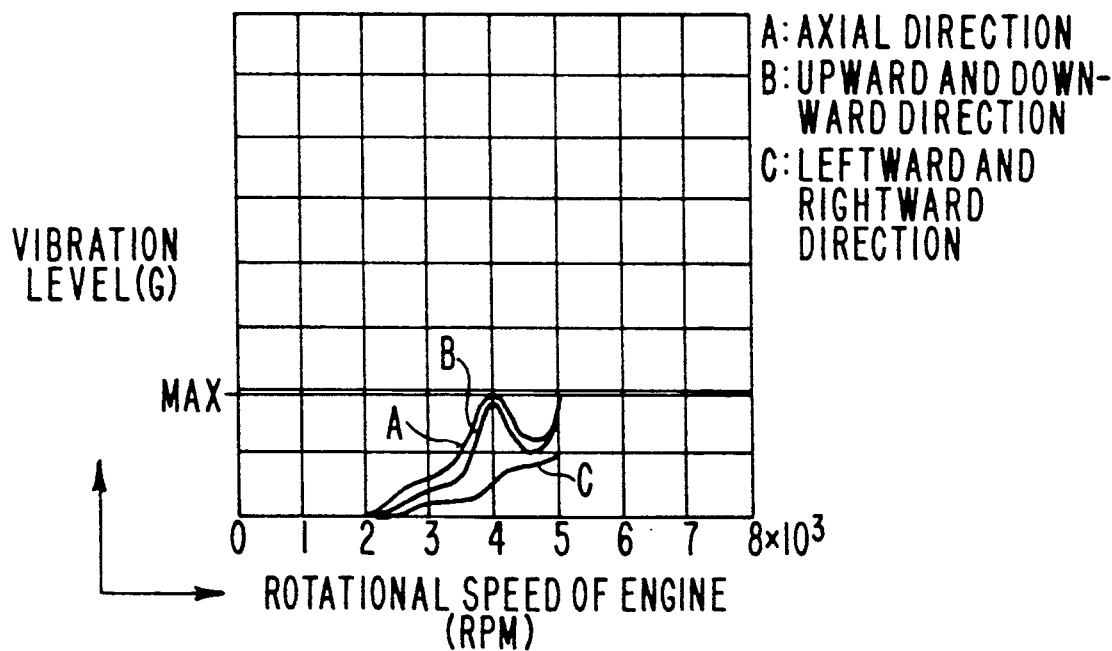
FIG. 6 is a graph illustrating the relationship between rotational speed of an engine and vibration level in an automotive air conditioning system including a vibration absorbing mechanism as shown in FIG. 1.

FIGS. 5 and 6 illustrate the relationship between rotational speed of an engine and vibration level. FIG. 5 illustrates the vibration level of a compressor in correspondence with rotational speed of an engine and FIG. 6 illustrates the vibration level of a compressor in correspondence with rotational speed of an engine when a vibration absorbing mechanism according to the present invention is installed on the compressor as shown in FIG. 3. As shown in FIG. 6, the maximum vibration level of the compressor is significantly reduced in the three orthogonal directions, i.e., axial, upward and downward, and leftward and rightward directions.

Since mass 10 and bushings 13 and 14 are formed symmetrically in the above three directions, resonance of the compressor does not occur in the rotational direction around the center of symmetry thereof. Accordingly, it is easy to predetermine the vibration frequency in the above three directions.

Furthermore, even if the elastic member between the outer and inner cylinders breaks, cylindrical mass 10 is prevented from dropping.

This invention has been described in detail in connection with the preferred embodiment, but is for example only and this invention is restricted thereto. It will be easily understood by those skilled in the art that other variations and modifications can be easily made within the scope of this invention.

I claim:

1. In combination with a compressor in an automobile air conditioning system, a vibration absorbing mechanism for attachment to said compressor in said automotive air conditioning system comprising a mass including a first penetration hole; first and second bushings, each of said bushings including an inner cylinder provided with a second penetration hole, an outer cylinder and an elastic member compressed between the outer surface of said inner cylinder and the inner surface of said outer cylinder, wherein said first and second bushings are disposed at both ends of said mass with said first penetration hole being in substantial alignment with the second penetration hole of said first and second bushings; a screw bolt passing through said first and second penetration holes and fastened by a nut; and means for attaching said vibration absorbing mechanism to said compressor, said attachment means being fixed to said outer cylinder of each of said bushings and said attachment means being attached to said compressor, wherein said mass has a mass vibration frequency and said compressor has a compressor vibration frequency and wherein said mass vibration frequency corresponds to said compressor vibration frequency at a point of resonnance of said compressor.

2. A vibration absorbing mechanism for a compressor of claim 1 wherein said mass and bushings are cylindrical.

3. A vibration absorbing mechanism for a compressor of claim 2 wherein said mass and bushings are symmetrically formed in the axial, upward and downward, and leftward and rightward directions.

* * * * *